United States Patent
Roodenburg et al.

(10) Patent No.: US 10,556,511 B2
(45) Date of Patent: Feb. 11, 2020

(54) AMUSEMENT RIDE WITH SPEED TRIM SYSTEM

(71) Applicant: VEKOMA RIDES ENGINEERING B.V., Vlodrop (NL)

(72) Inventors: Hendrik Ficus Roodenburg, Krimpen Aan Den Ijssel (NL); Eloy Jacobus Antonius Gerardus Caelen, Grevenbicht (NL)

(73) Assignee: VEKOMA RIDES ENGINEERING B.V., Vlodrop (NL)

( * ) Notice: Subject to any disclaimer, the term of this patent is extended or adjusted under 35 U.S.C. 154(b) by 261 days.

(21) Appl. No.: 15/571,769

(22) PCT Filed: May 3, 2016

(86) PCT No.: PCT/NL2016/050319
§ 371 (c)(1),
(2) Date: Nov. 3, 2017

(87) PCT Pub. No.: WO2016/178573
PCT Pub. Date: Nov. 10, 2016

(65) Prior Publication Data
US 2018/0162227 A1    Jun. 14, 2018

(30) Foreign Application Priority Data
May 4, 2015    (NL) ..................... 2014760

(51) Int. Cl.
*B60L 7/28*    (2006.01)
*A63G 7/00*    (2006.01)

(52) U.S. Cl.
CPC .................. *B60L 7/28* (2013.01); *A63G 7/00* (2013.01); *B60L 2200/26* (2013.01)

(58) Field of Classification Search
CPC ........... B60V 3/04; B61B 13/10; B61B 13/00; B61B 13/08; B61B 3/00; B60L 13/00
See application file for complete search history.

(56) References Cited

U.S. PATENT DOCUMENTS 3,443,524 A * 5/1969 Schneider ................ B60V 3/04
104/23.2
3,630,153 A * 12/1971 Guimarin ................ B61B 13/10
104/138.1

(Continued)

FOREIGN PATENT DOCUMENTS

CN    2838709 Y    11/2006
DE    201 19 119 U1    4/2003

OTHER PUBLICATIONS

International Search Report for PCT/NL2016/050319 dated Oct. 24, 2016.

(Continued)

*Primary Examiner* — Jason C Smith
(74) *Attorney, Agent, or Firm* — Birch, Stewart, Kolasch & Birch, LLP

(57) ABSTRACT

The invention relates to an amusement ride, such as a roller coaster, comprising a vehicle track and a speed trim system for reducing the speed of the passenger vehicle traveling along the vehicle track. The speed trim system comprises a magnet arrangement located on the passenger vehicle, at least one trim brake located along the track, one or more sensors for measuring the speed of the passenger vehicle approaching and/or passing the trim brake, and a control system. According to the invention, the trim brake comprises a pivotable supported induction blade, that can be pivoted about an induction blade pivot axis between an active position, for trimming the speed of the passenger vehicle while it passes the trim brake, and an inactive position.

20 Claims, 5 Drawing Sheets

(56) References Cited

U.S. PATENT DOCUMENTS

| | | | | |
|---|---|---|---|---|
| 4,657,435 A | * | 4/1987 | Chang | E02D 29/063 405/136 |
| 5,092,710 A | * | 3/1992 | Matiere | E03F 3/04 138/105 |
| 5,460,098 A | * | 10/1995 | Jackson | B60V 3/04 104/124 |
| 2004/0262103 A1 | | 12/2004 | Rosner | |
| 2005/0263356 A1 | | 12/2005 | Marzano et al. | |
| 2009/0063036 A1 | | 3/2009 | King et al. | |
| 2018/0162227 A1 | * | 6/2018 | Roodenburg | A63G 7/00 |

OTHER PUBLICATIONS

Written Opinion of the International Searching Authority for PCT/NL2016/050319 dated Oct. 24, 2016.

* cited by examiner

AMUSEMENT RIDE WITH SPEED TRIM SYSTEM

The invention relates to an amusement ride, such as a roller coaster, comprising a vehicle track, at least one passenger vehicle, and a speed trim system for reducing the speed of a passenger vehicle traveling along the vehicle track. The invention furthermore relates to a trim brake module and to a method for trimming the speed of a vehicle travelling along a track.

Many amusement or theme park ride attractions, such as roller coasters, drop devices, and ramp rides, have vehicles or coaches for carrying passengers along a track, wherein the track and vehicle are configured such that the track guides the vehicle and the track is along a main part of the track driven by its kinetic energy, which is generated by gravity and/or propulsion drives located along the track.

Particular sections along the track may require a reduction in travelling speed of the passenger vehicle, for example certain curved or helical sections or the track section entering the station. Also, due to external or unforeseen influences, such as temperature, humidity, fluctuations in mass, wear of wheels and/or wheel bearings, the speed of a passenger vehicle travelling along the track may exceed the designed or intended velocity.

Therefore, these types of rides are often provided with a system to trim the speed of a passenger vehicle travelling along the track, i.e. to reduce the speed of that vehicle to a desirable speed. Such a system is configured for measuring the velocity of the passenger vehicle travelling along the track, and, when the measured speed exceeds a predetermined maximum speed, applying a metered braking force to reduce the speed of the passenger vehicle to a speed close to or below a predetermined maximum speed.

For example from US 2005/0263356 it is known to utilize a linear synchronous magnetic motor as an eddy current brake. The linear motor is configured to be incrementally actuated to allow for the application of the variable braking force.

Such eddy current brakes comprise two arrays of magnets defining an elongate gap that enables the fin like stator member of a passing passenger vehicle to pass between them. When the stator member passes though the gap a magneto-motive force, i.e. braking force, is created. The brake can be deactivated by displacing one of the arrays of magnets forward or backward relative to the other array to diminish the magnetic field, and thus the braking force, to a negligible level.

However, in most instances, achieving the desired incremental application of brake force is not possible due to the high difficulty of correctly and quickly displacing the opposing arrays of magnets brought on by mechanical interference that occurs to friction in the elaborate guide system and due to the magnetic force between the arrays of magnets which tends to push the opposing magnets toward equilibrium.

It is an object of the invention to obviate or at least reduce the problems described hereinabove and in particular to provide an amusement ride with a speed trim system that allows for quick and reliable speed trimming of passenger vehicles passing along the track. It is a further object of the invention to provide a trim brake for use in such a ride and a method for trimming the speed of a passenger vehicle guided along a track.

According to the present invention, this object is achieved by providing an amusement ride, a trim brake module and a method for trimming the speed of a passenger vehicle travelling along the track of the amusement ride. An amusement ride according to the invention comprises at least one passenger vehicle, a vehicle track, and a speed trim system for reducing the speed of the at least one passenger vehicle traveling along the vehicle track. The vehicle track comprises a vehicle track structure for supporting the passenger vehicle and is configured for guiding the passenger vehicle along the vehicle track in a direction of travel.

The speed trim system comprises a magnet arrangement located on the at least one passenger vehicle, at least one trim brake located along the track, one or more sensors for measuring the speed of the passenger vehicle approaching and/or passing the trim brake, and a control system.

The magnet arrangement on the vehicle comprises at least one row of magnets, in an embodiment two rows of magnets defining a gap between them. The at least one trim brake comprises an induction blade having an elongated braking edge for passing closely along the at least one row of magnets, in an embodiment for passing through the gap of the magnet arrangement, of the passenger vehicle.

The trim brake is located along the track such that its induction blade, when in its active position, is located in the trajectory of the magnet arrangement of the passenger vehicle passing the trim brake, i.e. is located such that the interaction between the induction blade and the passing magnet arrangement generates a braking force.

When the passenger vehicle passes the trim brake, and the magnet arrangement of the passenger vehicle is passed along the trim brake such that the braking edge of the induction blade is moved along the magnet arrangement, a magneto-motive, i.e., braking force, is created which slows down the passenger vehicle.

In an embodiment according to the invention, the magnet arrangement located on the at least one passenger vehicle comprises two rows of magnets, which rows of magnets define an elongate gap between them for passing through the induction blade of the at least one trim brake. Such a configuration allows for attaining high braking forces from the interaction between the induction blade and the magnet arrangement.

In a further embodiment, the magnet arrangement on the passenger vehicle if furthermore configured for cooperating with an electro magnet arrangement of a launch system located along the track, i.e. a system configured for propelling the passenger vehicle along the track.

In an alternative embodiment, the magnet arrangement located on the at least one passenger vehicle, comprises a single row of magnets. Thus, the braking force generated by the interaction between the magnet arrangement and the induction blade it passes is reduced. Such a configuration requires less space on the vehicle to mount magnets, and thus allows for a compact and light magnet arrangement. It can be used when the design of the vehicle limits the mounting of magnets and/or when the required speed reduction in the ride does not necessitate a speed brake system with high braking forces.

According to the invention, the at least one trim brake further comprises an induction blade support and an actuator.

The induction blade support pivotably supports the induction blade, such that the induction blade can be pivoted about an induction blade pivot axis between an active position, for trimming the speed of the passenger vehicle while it passes the trim brake, and an inactive position.

In the active position the induction blade is supported with its braking edge extending substantially parallel to the direction of travel of the passenger vehicle passing the trim brake, and with its braking edge located in the trajectory of the magnet arrangement of the passing passenger vehicle. Thus, when the passenger vehicle passes the trim brake with the induction blade in its active position, the braking edge of the induction blade moves closely along the magnets of the magnet arrangement, a braking force is generated and the passenger vehicle is slowed down.

In the inactive position the induction blade is supported with its braking edge extending at an angle to the trajectory of travel of the passenger vehicle passing the trim brake, and with its braking edge located outside the trajectory of the magnet arrangement of the passing passenger vehicle. Thus, when the passenger vehicle passes the trim brake with the induction blade in its inactive position, the braking edge of the induction blade is not moved closely along the magnets of the magnet arrangement, no braking force is generated and the passenger vehicle is not slowed down.

It is noted that the braking edge is that part of the induction blade that passes closely along the row of magnets of the passenger vehicle, when that passenger vehicle passes the trim brake while the induction blade of the trim brake is positioned in its active position. Thus, in an embodiment in which the magnet arrangement comprises two rows of magnets which define a gap between them, the braking edge is that part of the induction blade that is passed through the gap defined by the two rows of magnets of the passenger vehicle, when that passenger vehicle passes the trim brake while the induction blade of the trim brake is positioned in its active position.

The actuator, preferably a pneumatic cylinder, can pivot the induction blade between its active and its inactive position.

The speed system furthermore comprises one or more sensors for measuring the speed of a passenger vehicle approaching and/or passing the trim brake and a control system, which control system is configured for receiving speed information from the one or more sensors and for comparing the speed measurement with a reference speed. The control system is furthermore configured for controlling the actuator to pivot the induction blade into and/or out of its active position to trim the speed of the passenger vehicle passing the trim brake, to trim the speed of the passing passenger vehicle, preferably to trim the speed to a speed below the predetermined reference speed, more preferably to trim the speed to substantially the reference speed.

The intention of trimming the speed of a passenger vehicle is not to stop the vehicle, but to slow down the passenger vehicle when it travels with a speed above a predetermined maximum speed. For example, when the reference speed is set at 7 m/s and a passenger vehicle approaches the trim brake with a speed of 8 m/s, the trim brake will be used to trim the speed of the passenger vehicle, i.e. to slow down the passenger vehicle. When the speed has been reduced to the predetermined reference speed, the induction blade of the trim brake will be pivoted in its inactive position, such that the passenger vehicle travels along with substantially the reference speed. Thus, the speed system is configured for reducing the speed of the at least one passenger vehicle traveling along the vehicle track. A trim brake according to the invention can be used for controlling the speed of the passenger vehicles when travelling along the track, i.e. while the passengers experience the ride, but also along storage sections of track of the ride, or at the entry of the station for embarking and disembarking passengers.

It is noted that the maximum braking capacity of a trim brake is determined on one end by the length of the induction blade, more in particular the length of the braking edged of the induction blade, and on the other end the length of the array of magnets provided on the passenger vehicle, and/or combined passenger vehicles for the induction blade to interact with. Furthermore, an array of trim brakes can be provided to increase the braking capacity It is submitted that, based on the information provided in this document, a skilled person can design a trim brake, a magnet arrangement and/or an array of trim brakes that enable trimming the speed of a passenger vehicle at a section of the track to a predetermined reference speed, based on, amongst others, data on the expected and/or measured range of speeds of the passenger vehicle at that track section and the preferred speed for a passenger vehicle at that track section.

Because the induction blade is pivotally supported, such that it can be pivoted about the induction blade pivot axis between its active position and its inactive position, the trim brake is provided with a reliable and robust low friction support of the induction blade, which enables the actuator to quickly move the indication blade between its active and inactive position.

This in contrast with prior art braking systems, in which the brake is actuated by moving an linear array of magnets in a substantially linear direction out of the track, such that the array of magnets remains parallel to the direction of travel of the passenger vehicle passing the trim brake. This lateral movement of the magnets requires a guide system for guiding the magnets and/or actuator, which guide system causes friction during movement of the magnets.

Furthermore, according to the invention, not the arrays of magnets but the induction blade is moved to switch the trim brake between braking and not braking. Since the induction blade has a low mass compared to the arrays of magnets, it can be moved more quickly and reliable than the arrays of magnets, especially when pivoted.

Also, according to the invention the blade is pivoted out of its active position, and not translated. Thus, the free end of the induction blade, i.e. the end of the induction blade located farthest away from the pivot point, is moved out of its active position faster than the end of the pivot blade located closest to the pivot point. Thus, the braking edge of the induction blade is moved more gradually out of its active position, i.e. starting with one end and ending with the other end, and the interaction with the magnet arrangement is more gradually reduced. Thus, less force is required to move the induction blade out of the magnetic field of the array of magnets which is also beneficial when the induction blade is to be moved quickly out of its active position while the passenger vehicle passes the trim brake, i.e. while the braking edged of the induction blade is located closely adjacent the arrays of magnets of the passing passenger vehicle.

Therefore, a trim brake according to the invention allows for more accurate and precise braking of the passenger vehicle and thus for a more accurate trimming the speed of the passenger vehicle travelling along the track of the amusement ride according to the invention.

A ride according to the invention can for example be a roller coaster comprising a closed loop rail track or a fall lifts comprising a vertical track with a passenger vehicle that is lifted and subsequently dropped along the track, etc. In another embodiment, the rail track can be U shaped, with the end sections of the track extending in the vertical direction. Such a ride, the passenger carriage travels back and forth between the opposite ends of the rail track. In a further embodiment, the midsection of the U shaped track can be provided with for example one or more loopings.

The passenger vehicle can be driven by gravity and/or motor, for example a linear drive or booster drives mounted along the track, as is the case with many roller coasters. In an embodiment, the ride comprises a linear motor for propelling the passenger vehicle along the track in the direction of travel, and the magnet arrangement provided on the at least one passenger vehicle is also part of the linear motor.

The vehicle track structure may for example comprise two or more rails for supporting and guiding the passenger vehicle. In an embodiment, the amusement ride is a roller coaster with a vehicle track structure comprises two main rail tubes and a so called back bone, connected to each other via ties and supported on pillars or pylons. In a fall lift, the track may for example be formed by vertical rails mounted to or part of a vertical frame work.

The passenger vehicle is often a rail bound vehicle, i.e. coupled with the track, more in particular with the vehicle track structure. For example with many roller coasters, the passenger vehicle comprises a carriage with wheels that engage the rails of the track such that the passenger vehicle is coupled with the track. Thus, the passenger vehicle follows the track, i.e. is guided by the track structure, along curves, loopings, etc.

The passenger vehicle typically comprises one or more seats with retainer systems for securing a passenger in its seat during the ride.

The combination of the magnet arrangement and the induction blade forms an eddy current trim brake for reducing the speed of a passenger vehicle traveling along the vehicle track. According to the invention, the magnets are located on the passenger vehicle to interface with the induction blade of a trim brake located along the track. In an embodiment, the magnet arrangement has an air gap or groove located between two linear and parallel arrays of magnets. This central passage extends in the direction of travel of the passenger vehicle, and is configured for receiving the braking edge of the induction blade of a trim brake located along the track. This braking edge is the part of the conduction blade that protrudes into the track, when the induction blade is supported in its active position, such that it moves along the central passage when the passenger vehicle passes the trim brake. In an alternative embodiment, the magnet arrangement may comprise a single row of magnets, which is moved along the braking edge of the induction blade, such that a braking force is generated.

Preferably, the magnet arrangements on the passenger vehicle are permanent magnets. Thus, no energy source is needed to power the magnets, and the passenger vehicle does not need to be provided with for example batteries or a wiper connection for engaging a power track extending along the track of the passenger vehicle. The use of permanent magnets thus allow for a simple configuration of the amusement ride, more in particular of the at least one passenger vehicle of the amusement ride.

In an alternative embodiment, at least some of the magnets of the magnet arrangement are electromagnets. In such an embodiment, the magnets may be turned off to prevent interaction between the magnets and an induction blade of a trim brake located along the track.

In an embodiment, the magnets are provided in a fixed configuration on the passenger vehicle, for example in the form of two rows of magnets on located on the bottom side of the carriage, facing the track. In an alternative embodiment, the magnets can be mounted movably, such that they can be moved between a position for interaction with an induction blade located along the track and a position in which they do not interact with an induction blade of a trim brake located along the track. In an embodiment, the magnets can be moved by the passengers, in another embodiment by remote control and/or automatically by a control system, which control system may be provided on the passenger vehicle.

In an embodiment, the passenger vehicle is a train like vehicle, comprising multiple vehicles connect to form a chain of vehicles. In such an embodiment one, multiple or all vehicles may be provided with a magnet arrangement. By providing al the vehicles with magnet arrangements, the magnet arrangements can be combined in what is effectively a single extra long magnet arrangement.

The induction blade of the trim brake is a fin like non-ferro braking element, preferably made of aluminium or brass. The braking edge of the induction blade is the part that passes through the magnetic field of the magnet arrangement of a passenger vehicle passing the trim brake. The braking edge may be only an edge section of a larger induction blade. Alternatively, the induction blade, when in its active position, has a height similar to that of the magnets of the magnet arrangement, or is dimensioned such that it is fully received in an air gab defined by two rows of magnets of the magnet arrangement of a passing passenger vehicle. In such an embodiment, the induction blade and the braking edge are substantially the same. In a further embodiment, the induction blade, when in its active position, has a height smaller than the height of the magnets of the magnet arrangement.

When the braking edge passes adjacent the magnets of the magnet arrangement, or optionally through an air gap defined by two rows of magnets of the magnetic arrangement, a magnetic force is generated that acts in a direction opposite to the direction of travel of the passenger vehicle, based on the principle of an eddy current brake, thus slowing down the vehicle.

The braking edge of the induction blade is a fin like, elongated braking edge for interfacing with the magnet arrangements of passenger vehicles travelling along the track. It is noted that the braking edge may be a straight edge of the blade, but may for example also be a curved or jagged edge.

According to the invention, the trim brake comprises an actuator, preferably a pneumatic cylinder, which can pivot the induction blade between its active and its inactive position. The control system is configured for controlling the actuator and thus to pivot the brake fin into and out of its active position. The trim brake can be controlled in programmed fashion as a function of the vehicle's speed along the track. Alternatively, or in addition, the control system may be configured to receive input from a person, for example a person controlling the ride, or from one or more passengers of the passenger vehicle, to activate, deactivate the trim brakes and/or to set/adjust the reference speed used by the control system for trimming the speed of the passenger vehicle.

The invention allows for quickly and more gradually removing the induction blade from the magnet arrangement of a passing passenger vehicle, by pivoting the induction blade into its inactive position, when the speed of the passenger vehicle has been reduced to a predetermined reference speed. When the induction blade is in its inactive position, the braking force is removed and the passenger vehicle is no longer slowed down by the trim brake. It is noted that the quicker the blade can be removed, the more accurate the trim brake can trim the speed of the passenger vehicle to a predetermined reference speed.

Thus, in a track of an amusement ride according to the invention, for example the speed of passenger vehicles traveling with speeds above 7 m/s, for example with speed of 10 m/s, can be reduced to a speed of about 7 m/s.

In an embodiment of a ride according to the invention the speed trim system comprises an array of multiple trim brakes located adjacent each other and along the track, such that the induction blades of the trim brakes, when in their active position, are in line with each other when seen in the direction of travel of a passenger vehicle passing the array of trim brakes, and thus define a speed trim zone extending along a trajectory of the passenger vehicle track.

Thus, in such an embodiment the speed trim system uses multiple trim brakes to trim the speed of a passenger vehicle that passes the trim zone.

In a further embodiment, the speed of the passenger vehicle is measured while it passes through the speed trim zone. The control system can thus control the trim brakes in coherence with the actual speed of the passenger vehicle while passing the trim brakes in the speed trim zone.

Preferably, in such a speed trim zone, the trim brakes are located closely adjacent each other, preferably are linked into an array of trim brakes, i.e. are positioned with their induction blades in line with each other and with an air gap between the blades of subsequent trim brakes kept to a minimum, i.e. the air gap is less than 30% of the length of an braking edge of a single induction blade, more preferably less than 20% of the length of an braking edge of a single induction blade, most preferably less than 10% of the length of an braking edge of a single induction blade. Thus, the induction blades of the subsequent trim brakes, when supported in their active position, form a segmented induction blade, extending over the length of the speed trim zone, which segments can each be independently pivoted between an active and an inactive position.

In an embodiment according to the invention, the speed trim zone comprises permanent brakes, i.e. brakes with fixed induction blades, as well as trim brakes, which according to the invention have a pivotable mounted induction blade. For example, in an embodiment the speed trim zone is provided at the entry of a station to slow down all passenger vehicles entering the station. Thus permanent brakes can be used for providing the main part of the braking force required, and the trim brakes can be used to provide an additional braking force to those passenger vehicles approaching the station with a speed above average. Also, other types of brakes can be used, for example friction brakes, to provide the main braking force in a speed trim zone.

In an embodiment each trim brake and/or array of trim brakes can be provided with its own control system. Alternatively, a single control system controls multiple trim brakes and/or arrays of trim brakes, located at different sections of the track, or even all trim brakes and arrays of trim brakes located along the track.

In an embodiment of a ride according to the invention the at least one trim brake is mounted to the track such that the free end of the braking edge of the trim brake, i.e. the end located furthest away from the pivot axis, points opposite the direction of travel when the induction blade is supported in its active position.

Thus, in such an embodiment, the pivot point of the induction blade is located downstream and the free end, which is moved over the largest distance when the induction blade is pivoted between its active and its inactive position, is located upstream, the streaming direction being the direction of travel of a passenger vehicle along the at section of the track. A passenger vehicle passing the trim brake thus first encounters the free end of the induction blade, and from there travels towards the end of the induction blade located closest to the pivot axis of the trim brake.

By thus positioning the trim brake, the induction blade, when pivoted from its active towards its inactive position, is moved in the direction of travel of the passenger vehicle. Also, the electromagnetic forces generated by a passenger vehicle passing the trim brake pull the induction blade into its active position, which is beneficial because the support function of the actuator is thus less critical, i.e. when the induction blade is not fully supported in its active position due to for example wear of the actuator or trim, a passing passenger vehicle can pull the induction blade into that position.

It is noted that when referred herein to the direction of travel of a passenger vehicle along a track, this is the direction the passenger vehicle travels in when the speed control system, more in particular the trim brake located along that section of track, is to be used to trim the speed of the vehicle when it surpasses a predetermined reference speed. Typically, this is the direction the passenger vehicle travels in when it transports passengers along the track, i.e. during use, and which may not be the direction the passenger vehicle travels for example to park it during down time of the attraction.

In an embodiment of a ride according to the invention the actuator is controlled to support the induction blade of the trim brake in its active position when a passenger vehicle approaches the trim brake, and to pivot the induction blade into its inactive position while the passenger vehicle passes and the speed of the passenger vehicle is at, or below, the predetermined reference speed. Thus, when the speed trim system is ready to receive a passenger vehicle to trim the speed thereof if needed, the induction blade of the trim brake is supported in its active position. In this embodiment, the general condition of the one or more trim brakes is their active or braking condition. This "always on" condition of the trim brakes reduces that chance that a passenger vehicle passes the trim brake with a speed above the predetermined reference speed without being slowed down.

In an embodiment of a ride according to the invention the blade support of the at least one trim brake comprises an induction blade spacer arm, which induction blade spacer arm has a support section at one end, which support section is mounted to the induction blade, and a spacer section at an opposite end, via which spacer section the spacer arm is pivotable supported such that part of the spacer section extends between the induction blade pivot axis and the elongated braking edge of the induction blade and the braking edge is thus in its longitudinal direction located at a spacer distance from the induction blade pivot axis. In an embodiment, the spacer distance is at least 15 cm and/or is at least 15% of the length of the braking edge.

By using a spacer arm to support the induction blade, the braking edge of the induction blade is set at a distance from the pivot axis. Thus, the angle over which the induction blade should be pivoted to move it, more in particular its braking edge, between the active and the inactive position is reduced, which enables fast switching between the active and inactive position of the trim brake and for a compact trim brake.

Also, providing the spacer arm allows locating the pivot axis closely to the track, i.e. close to a vehicle passing the trim brake, more in particular close to the array of magnets provided on that passing vehicle, which in combination with the small pivot angle allows a compact trim brake. It is noted that the spacer arm preferably extends substantially parallel to the braking edge, i.e. in a direction substantially parallel to the longitudinal axis of the braking edge to maximise this effect.

In contrast, when the pivot axis is located closely to the track and the braking edge is at one end located closely to the pivot axis, that end of the braking edge is not substantially moved away from the track when the induction blade is pivoted into its inactive position.

Furthermore, the opposite end, i.e. the free end, of the braking edge is moved over a substantial distance when the induction blade is pivoted into its inactive position. Such a trim brake requires substantial space in, or alongside, the track structure to enable the induction blade to be positioned properly.

Providing the trim blade with a spacer arm is thus beneficial in providing a compact trim brake in which the indication blade is pivotable mounted.

In a further embodiment of an amusement ride according to the invention, the spacer section of the spacer arm is offset relative to the support section, such that the spacer section is located outside a plane defined by the induction blade, to allow for two or more trim brakes to be located closely adjacent to each other, such that the induction blades of the trim brakes are, when in their active position, in line with each other and an air gab between the braking edges of those induction blades is smaller than the length of the spacer section of the spacer arm.

In other words, in such an embodiment the spacer arm is provided with a spacer section staggered relative to the support section which allows for two or more similar trim brakes to be located closely adjacent to each other, such that the distance between the induction blades of the adjacent trim brakes, more in particular the braking edges of the induction blades of the adjacent trim brakes, when seen in the direction of travel of a passenger vehicle passing the trim brakes, is smaller than the length of the spacer section of the spacer arm.

The spacer arm thus allows for the trim brakes to be linked into an array of trim brakes, in which they are positioned with their induction blades in line with each other and with the air gap between the induction blades of subsequent trim brakes kept to a minimum, i.e. the air gap is less than 30% of the length of an braking edge of a single induction blade, more preferably less than 20% of the length of an braking edge of a single induction blade, most preferably less than 10% of the length of an braking edge of a single induction blade. Thus, the induction blades of the subsequent trim brakes, when supported in their active position, form a segmented induction blade, extending over the length of the speed trim zone, which segments can each be independently pivoted between an active and an inactive position. Furthermore, the induction blade pivot axis is preferably located close to the track, such that induction blade pivot axis of a first trim brake intersects the induction blade and/or the support section of the spacer arm of that induction, when the latter is in its active position. Such a configuration is beneficial for providing a compact array of trim brakes.

In a further embodiment of an amusement ride according to the invention, the trim brake module comprises multiple pivotable supported induction blades, which pivot blades share a single trim blade support base, and the at least one passenger vehicle comprises corresponding magnet arrangements for cooperating with the respective induction blades. Thus, the double arms of the spacer section of the spacer arm define between them a receiving space for positioning an end section of the induction blade of an adjacent trim brake and allow for pivotable mounting the spacer arm via the double arms, i.e. on opposite sides of that receiving space. Thus, this embodiment combines a stable support of the induction blade with the ability of linking multiple trim brakes into a compact array of trim brakes.

In an embodiment of an amusement ride according to the invention, the trim brake is a trim brake module that can be mounted to the track and demounted from the track as a whole, in which trim brake module the induction blade support comprises a support base, via which support base the trim brake is mounted to the track. Such a configuration of the trim brake facilitates replacing the trim brake, for example to enable maintenance. In a preferred embodiment, the module is mounted to the track using nuts and bolts or other easy to remove securing means. In an alternative embodiment, the module is welded to the track structure, and is only removed in exceptional cases. Furthermore, providing a support base to which the components of the trim brake, such as the actuator, are mounted, enables to better control the relative position of the components. For example, the support base can be provided with mountings for pivotable mounting the induction blade or a spacer arm supporting the induction blade, mountings for mounting the actuator, etc. since the base defines the relative position of the mountings, it also defines the relative position of the components.

In a further embodiment, the trim brake module comprises multiple pivotable supported induction blades, which pivot blades share a single trim blade support base, and the at least one passenger vehicle comprises corresponding magnet arrangements for cooperating with the respective induction blades.

For example, the trim brake module can be provided with a pair of parallel, pivotably supported induction blades and the passenger vehicle comprises two corresponding magnet arrangements for cooperating with the respective induction blades. By providing the trim brake module with multiple induction blades, the braking capacity of the trim brake module is increased without increasing the length of the trim brake module. Depending on the design of the passenger vehicle, the track, and the position of the trim brake module, for example three or more parallel induction blades can also be provided to further increase the braking capacity of the trim brake.

It is furthermore noted that preferably, the induction blades, and thus the corresponding magnet arrangements on the passenger vehicle, are located relative to the centre of the track such that the braking force generated when the passenger vehicle passes the trim brake acts on the centre of gravity of the vehicle. Thus, in most cases the magnet arrangements and the induction blades are located symmetrical relative to the centre of the track, i.e. when using a single induction blade it is located at the centre of the track, when using two induction blades they are located on opposite sides of the centre of the track, etc. In an embodiment of a ride according to the invention the actuator is a cylinder, preferably a pneumatic cylinder. Such an actuator is highly suitable for moving the induction blade between its active and inactive position. In an embodiment, the cylinder is a direct acting cylinder, i.e. is coupled with one end to the induction blade and with the other end to the induction blade support. In an embodiment, the cylinder is mounted in the trim brake such that the central axis of the cylinder is located in line with the blade. This configuration allows for a narrow trim brake, which is beneficial since the space available for mounting a trim brake in a track structure is often limited.

In a further embodiment, the end of the cylinder that is coupled to the induction blade is located closer to the end of the braking edge that faces the induction blade pivot axis, i.e. the pivot end, than to the end of the braking edge facing away from the induction blade pivot axis, i.e. the free end. Thus, the cylinder functions as a lever, which can pivot the induction blade at an increased speed compared to an actuator that is linked to induction blade at, or close to, the end of the braking edge that faces away from the induction blade pivot axis.

In an alternative embedment, the actuator is an electro-magnet or a drive, such as an electric motor, engaging, directly or indirectly, for example via a chain link, the pivot axis of the blade support for pivoting the induction blade between its active and inactive position. In an embodiment of an amusement ride according to the invention, the magnet arrangement of the passenger vehicle is provided at the side of the passenger vehicle that faces the track, and preferably the trim brake is received in the track structure, for example between two rails of said track, which rails guide and support the passenger vehicle. Such a configuration can for example be used with roller coaster rides, which typically comprise a tract structure of two rails supported by a backbone, which rails and backbone form a track that is supported on columns or pylons. In such an embodiment, the trim brakes can for example be mounted to the ties, i.e. the connecting structures, that fix the rails to each other and to the back bone.

It is noted that these types of roller coasters can be provided with passenger vehicles that mainly travel along the top side of the track structure, or can be provided with passenger vehicles that mainly travel along the top side of the track structure, and in which the passengers for example hang below the track to simulate a flying experience.

The invention furthermore provides a trim brake module for mounting along a vehicle track of an amusement ride to trim the speed of a passenger vehicle traveling along the track, preferably to be used in combination with one or more sensors and a control system to provide an amusement ride according to the invention.

It is noted that a trim brake module according to the invention can be used in an amusement ride according to the invention. Thus, many of the features and advantageous described above in relation to the amusement ride according to the invention can also be combined and are also provided by a trim brake module according to the invention. Furthermore, many of the features and advantageous described here below in relation to the trim brake module according to the invention can also be combined and are also provided by an amusement ride according to the invention.

In an embodiment, a trim brake module according to the invention comprises a trim brake having:
  an induction blade, the induction blade having an elongated braking edge for passing along at least one row of magnets of a magnet arrangement of the passenger vehicle;
  an induction blade support, which induction blade support pivotable supports the induction blade, such that the induction blade can be pivoted about an induction blade pivot axis between an active position, for trimming the speed of the passenger vehicle while it passes the trim brake, and an inactive position; and
  an actuator, preferably a pneumatic cylinder, which can pivot the induction blade between its active and its inactive position;
  wherein the induction blade support comprises a support base which is configured to mount the trim brake to a track structure of the vehicle track of the amusement ride
    such that the induction blade, when in its active position, is supported with its braking edge extending substantially parallel to a direction of travel of the passenger vehicle guided by the track structure along a vehicle track and thus along the trim brake mounted to the track structure of that vehicle track;
    such that the braking edge of the induction blade, when in its active position, is located in the trajectory of a magnet arrangement of the passenger vehicle passing the trim brake to interact with those magnets and generate a braking force; and
    such that the induction blade, when in its inactive position, is supported with its braking edge extending at an angle to the trajectory of travel of the passenger vehicle passing the trim brake, and with its braking edge located outside the trajectory of the magnet arrangement of the passing passenger vehicle.

In an embodiment of a trim brake module according to the invention the induction blade support further comprises an induction blade spacer arm, which induction blade spacer arm has a support section at one end, which support section is mounted to the induction blade, and a spacer section at its opposite end, via which spacer section the spacer arm is pivotable mounted to the support base, and wherein part of the spacer section extends between the induction blade pivot axis and the elongated braking edge of the induction blade and the braking edge is thus in its longitudinal direction located at a spacer distance from the induction blade pivot axis.

By using a spacer arm to support the induction blade, the braking edge of the induction blade is set at a distance from the pivot axis. Thus, the angle over which the induction blade should be pivoted to move it, more in particular its braking edge, between the active and the inactive position is reduced, which enables fast switching between the active and inactive position of the trim brake and for a compact trim brake.

Also, providing the spacer arm allows to locate the pivot axis closely to the track, which in combination with the small pivot angle allows a compact trim brake. It is noted that the spacer arm preferably extends substantially parallel to the braking edge, i.e. in a direction substantially parallel to the longitudinal axis of the braking edge to maximise this effect.

In an embodiment, the spacer distance is at least 15 cm and/or is at least 10% of the length of the braking edge, preferably is at least 15% of the length of the braking edge, most preferably is at least 20% of the length of the braking edge.

In a further embodiment of a trim brake module according to the invention, the spacer section of the spacer arm is offset relative to the support section, such that the spacer section is located outside a plane defined by the induction blade, to allow for mounting two trim brake modules adjacent each other along a vehicle track such that the induction blades of the trim brakes of the two trim brake modules, when in their active position, are in line with each other and an air gab between the braking edges of those induction blades is smaller than the length of the spacer section of the spacer arm. Thus, the braking edges are located at a mutual distance smaller than the spacer distance, and the trim brake modules can be positioned closely adjacent each other along the vehicle track to form an array of trim brakes, and thus define a speed trim zone extending along a trajectory of the passenger vehicle track. The induction blades of these trim brake modules, when supported in their active position, form a segmented induction blade, extending over the length of the speed trim zone, which segments can each be independently pivoted between an active and an inactive position.

In an embodiment, the trim brake module according to the invention, the support base of the induction blade support is a mounting structure, preferably in the form of a plate, for mounting the trim brake on a backbone of a track structure, and which mounting structure preferably is configured to saddle the backbone of a track and/or is configured to engage the rails of the track. For example, the trim brake module may comprise two or more parallel induction blades, each pivotable supported and each provided with their own actuator, which induction blades and actuators are each mounted on the shared support base of the induction blade support, such that by mounting the shared support base to a track structure the whole trim brake module is mounted to the track structure.

In an embodiment of a trim brake module according to the invention, the actuator comprises a single pneumatic cylinder for pivoting the induction blade between its active and its inactive position, which cylinder preferably is a direct acting cylinder, i.e. is coupled with one end to the induction blade or the support section of the spacer arm of the blade support carrying the induction blade, and with the other end to the support base of the induction blade support.

In a further embodiment, the end of the cylinder that is coupled to the induction blade is located closer to the end of the braking edge that faces the induction blade pivot axis, i.e. the pivot end, than to the end of the braking edge facing away from the induction blade pivot axis, i.e. the free end. Thus, the cylinder functions as a lever, which can pivot the induction blade at an increased speed compared to an actuator that is linked to induction blade at, or close to, the end of the braking edge that faces away from the induction blade pivot axis.

In a further and/or wherein preferably the central axis of the cylinder is located in line with the blade to provide a narrow and compact trim brake. The compact design of a trim brake according to the invention enables the trim brake to be mounted between the rails of a typical roller coaster track.

In an embodiment of a trim brake module according to the invention, the trim brake module comprises a multiple pivotable supported induction blades, preferably each provided with a dedicated spacer arm and actuator, to interact with corresponding magnet arrangements provided on a passenger vehicle travelling along a track.

Thus, the invention provides a compact trim brake module with a large braking capacity. For example three or more parallel induction blades can be provided to increase the braking capacity of the trim brake module. Preferably, the induction blades are located symmetrical relative to an (imaginary) centre plane of the trim brake module. By mounting the trim brake module such that a central axis of the track is located in said centre plane, the induction blades are located symmetrical relative to the centre of the track, i.e. when using a single induction blade it is located at the centre of the track, when using two induction blades they are located on opposite sides of the centre of the track, etc. thus the braking forces enacted upon the passenger vehicle are more balanced relative to the center of said vehicle. A more unbalanced braking force may for example cause vibrating of the vehicle during braking.

According to the invention a quickly retractable induction blade is provided to trim the speed of passenger vehicles that travel along a vehicle track back to a predetermined reference speed, for example to a reference speed of 7 m/s, If the speed of the passenger vehicles is above a predetermined reference speed, for example 10 m/s. The invention provides a trim brake with an induction blade that can not only be moved swiftly into an inactive position but can also moved into that inactive position when it is braking a passenger vehicle, to thus stop braking that passenger vehicle as soon as it has reached the predetermined reference speed.

The invention provides a design of the trim brake that allows for a robust and compact trim brake with a stable support of the pivotable mounted induction blade, and which can be incorporated in a trim brake module. The pivotable support of the induction blades, such that the blades are pivoted about an induction blade pivot axis, allows for a low friction support, and for quickly moving the blade into and out of the trajectory of a passing passenger vehicle. Furthermore, pivoting the blade instead of moving arrays of magnets to reduce the braking speed provides low mass configuration which can be moved quickly. Thus, the invention allows for active braking, i.e. quickly reducing the braking force while the passenger vehicle passes the trim brake.

The invention also provides a speed trim system, comprising a control system and a trim brake with a pivotable supported induction blade according to the invention, to be mounted on a vehicle track of an amusement ride to provide an amusement ride according to the invention.

The invention furthermore provides a method for trimming the speed of a passenger vehicle travelling along the track of an amusement ride according to the invention, the method comprising the steps of:
providing at least one trim brake;
supporting the induction blade of the at least one trim brake in its active position;
measuring the speed of a passenger vehicle approaching the trim brake;
if the speed of the passenger vehicle is above a predetermined reference speed; braking the passenger vehicle while it passes the trim brake; and
pivoting the trim brake into its inactive position when the passenger vehicle has been slowed down to the predetermined reference speed.

It is noted that sensors may be provided to measure the speed of the passenger vehicle while it passes the trim brake, and thus while it is slowed down by the trim brake, and to communicate to the control system if the passenger vehicle has been slowed down to the reference speed. In an alternative embodiment, the speed of the approaching passenger vehicle is measured, which information is used to calculate the braking time required to slow down the passenger vehicle to the reference speed, i.e. the time induction blade is to be supported in its active position and after which it is to be pivoted into its inactive position.

The above method can be used with a single trim brake or with multiple trim brakes. When multiple trim brakes are used to trim the speed of passing passenger vehicles, these trim brakes preferably are mounted closely adjacent each other, such that they form an array of trim brakes.

A further method according to the invention comprises the steps of:
providing an array of trim brakes, the array of trim brakes defining a speed trim zone along the track of the amusement ride;
supporting the induction blades of the trim brakes in their active position;

measuring the speed of a passenger vehicle approaching the trim brake;

optionally, in dependence of the speed measured, pivoting one or more induction blades, preferably of the trim brakes located at the downs stream end of the array, into their inactive position to thus provide the array of trim brakes with a dedicated braking capacity if the speed of the passenger vehicle is above a predetermined reference speed: braking the passenger vehicle while it passes the array of trim brakes; and pivoting one or more induction blades into their inactive position when the passenger vehicle has been slowed down to the predetermined reference speed.

It is noted that with eddy current brakes, in particular when using permanent magnets, the maximum braking capacity is determined on one end by the length of the induction blade, and/or the number induction blades provided, and on the other end the length of the array of magnets provided on the passenger vehicle, and/or combined passenger vehicles.

Using a single trim brake to slow down a passenger vehicle is in particular suitable for passenger vehicles with long magnet arrangements, for example a train of connected passenger vehicles, each provided with an array of magnets.

A further method according to the invention comprises the steps of:

providing multiple trim brakes in an array configuration, the array of trim brakes defining a speed trim zone along the track of the amusement ride;

supporting the induction blades of the trim brakes in their active position;

measuring the speed of a passenger vehicle approaching the trim brakes;

optionally, in dependence of the speed measured, pivoting one or more induction blades, preferably of the trim brakes located at the downstream end of the array, into their inactive position to thus provide the array of trim brakes with a dedicated braking capacity;

if the speed of the passenger vehicle is above a predetermined reference speed; braking the passenger vehicle while it passes the trim brake; and pivoting one or more induction blades into their inactive position when the passenger vehicle has been slowed down to the predetermined reference speed.

Using an array of trim brake to slow down a passenger vehicle is in particular suitable for slowing down single passenger vehicles, in contrast with trains of passenger vehicles, and/or passenger vehicles with magnet arrangements of a limited length.

Preferably, a method according to the invention furthermore provides the step of pivoting the induction blade of a trim brake back into the active position after the passenger vehicle has passed the trim brake.

Advantageous embodiments of the amusement ride, a trim brake according to the invention and the method according to the invention are disclosed in the subclaims and in the description, in which the invention is further illustrated and elucidated on the basis of a number of exemplary embodiments, of which some are shown in the schematic drawing.

DETAILED DESCRIPTION OF THE DRAWINGS

Figure 1:
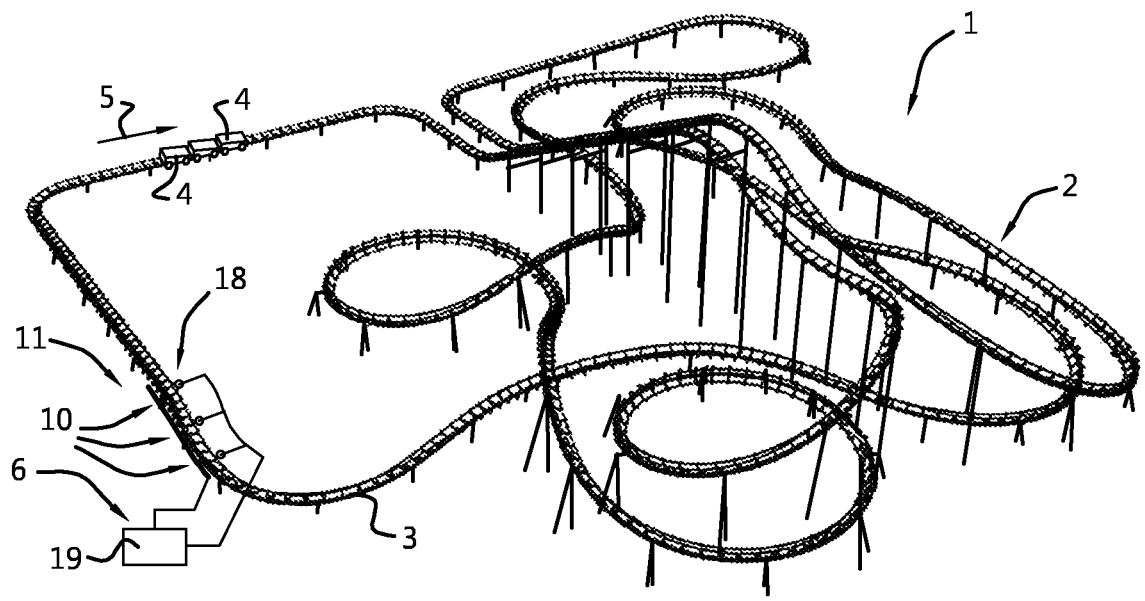
FIG. 1 shows a schematic perspective view of an amusement ride according to the invention.

FIG. 1 shows a schematic perspective view of an amusement ride 1 according to the invention, in the particular embodiment shown a roller coaster ride. The amusement ride comprises a vehicle track 2, which vehicle track comprises a vehicle track structure 3 for supporting a passenger vehicle. In the particular embodiment shown, the track is a rail type track, comprising rail tubes connected to a back bone via ties. Such tracks are often used with roller coaster rides.

In the particular embodiment shown, the amusement ride is provided with multiple passenger vehicles 4, which are linked to form a train of passenger vehicles. The vehicle track structure 3 is configured for guiding this train of passenger vehicles 4 along the vehicle track 2 in a direction of travel, which is indicated with an arrow 5.

Figure 7:
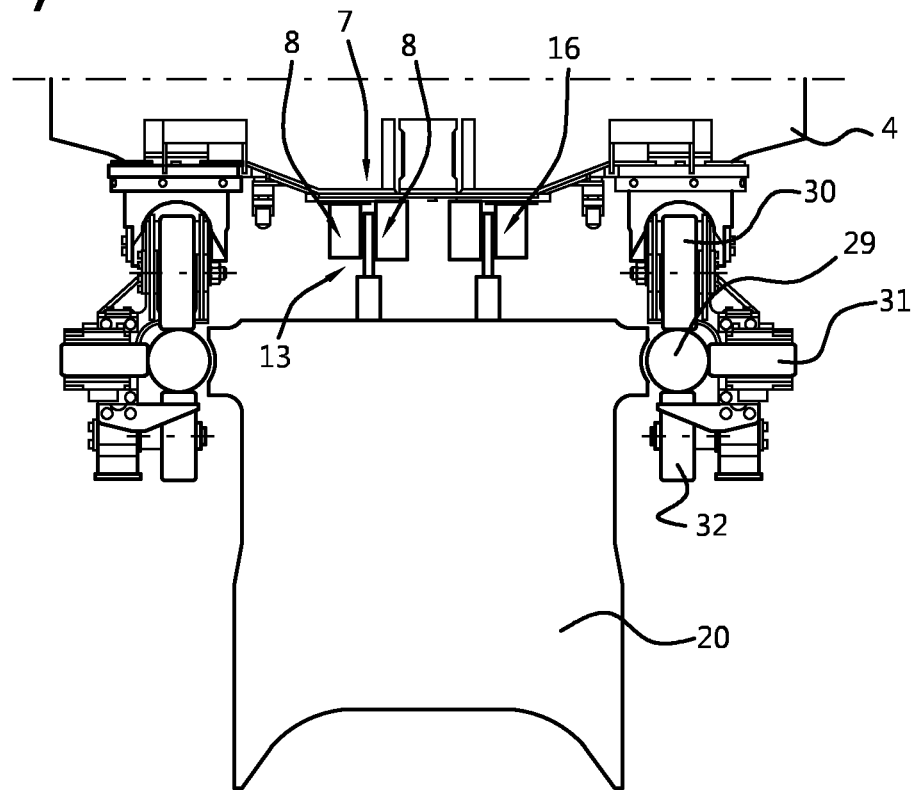
FIG. 7 shows a magnet arrangement the passenger vehicle.

Passenger vehicles for travelling along a vehicle track defined by a vehicle track structure are known from the art. These types of carriages consists of a frame, provided with one or more passenger supports, for example seats or devices for supporting passengers hanging in a forward position to provide a flying experience during the ride. FIG. 7 shows a close up of part of the passenger vehicle 4 and the vehicle track structure 3 in cross section. The passenger vehicle 4 is provided with wheels 30 to support the passenger vehicle on the track structure 3, more in particular on the rail tubes of the track structure, and side roller 31 and lift-off rollers 32 that secure the passenger vehicle to the track structure, more in particular to the rail tubes 29 and the back bone 28. In the exemplary embodiment, the running wheels, side wheels and lift-off rollers are positioned at 90 degrees intervals relative to each other and move on the surface of the rail tubes. However, alternative configurations are also possible.

Since passenger vehicles an track structures for amusement rides are known from the prior art, they will not be elaborated upon The amusement ride 1 is provided with a speed trim system 6 for reducing the speed of the at least one passenger vehicle 4 traveling along the vehicle track 2.

According to the invention, the speed trim system 6 comprises magnet arrangements 7 located on the passenger vehicles 4, which magnet arrangements in the embodiment shown each comprise two rows of magnets 8 defining a gap 9 between them. FIG. 7 shows a close up of a passenger vehicle 4 with part of its magnet arrangements 7. In the embodiment shown, the magnet arrangements 7 are provided on the bottom side of the passenger vehicles 4, i.e. the side of the passenger vehicles that faces the track 2.

The speed trim system 6 further comprises multiple trim brakes 10 located along the vehicle track 2 and mounted to the track structure 3. In the embodiment shown, the trim brakes 10 are provide in arrays, i.e. rows of closely adjacent trim brakes, which arrays of trim brakes 10 each define a speed trim zone 11.

Figure 2:
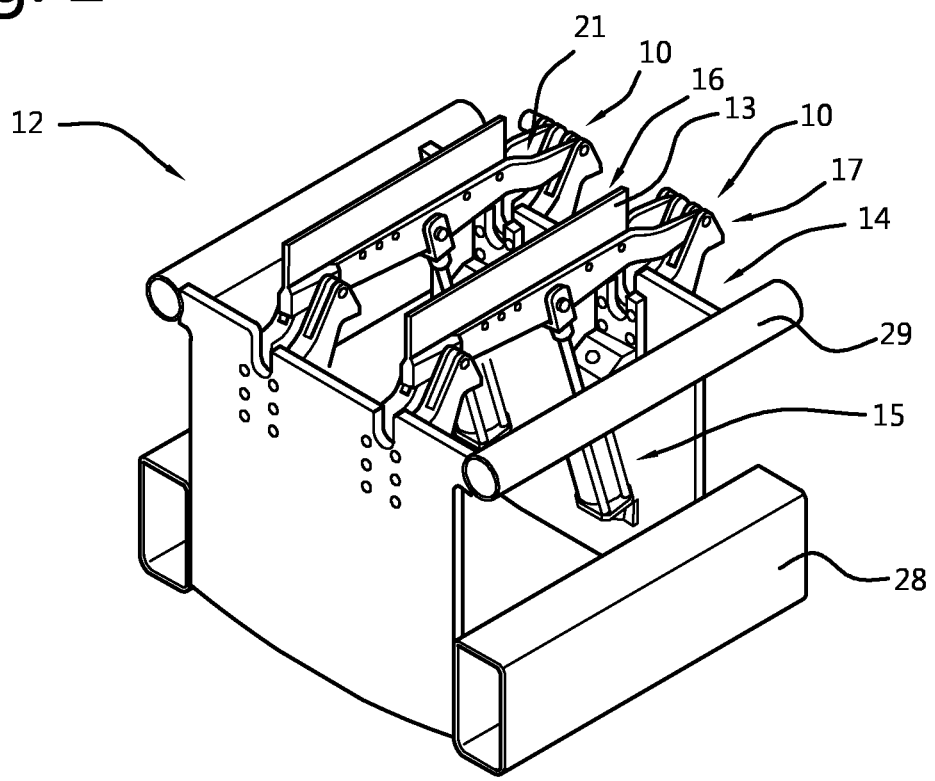
FIG. 2 shows a perspective view of a section of the vehicle track provided of the ride of FIG. 1.

FIG. 2 shows a perspective view of a section of the vehicle track 2 provided with two trim brakes 10. The trim brakes are part of a trim brake module 12, which trim brake module can be mounted as a whole in the vehicle track 2. In the exemplary embodiment of a ride according to the invention, multiple of these modular units 12 are mounted along the track 2 to form an array of trim brakes 10.

Figure 3:
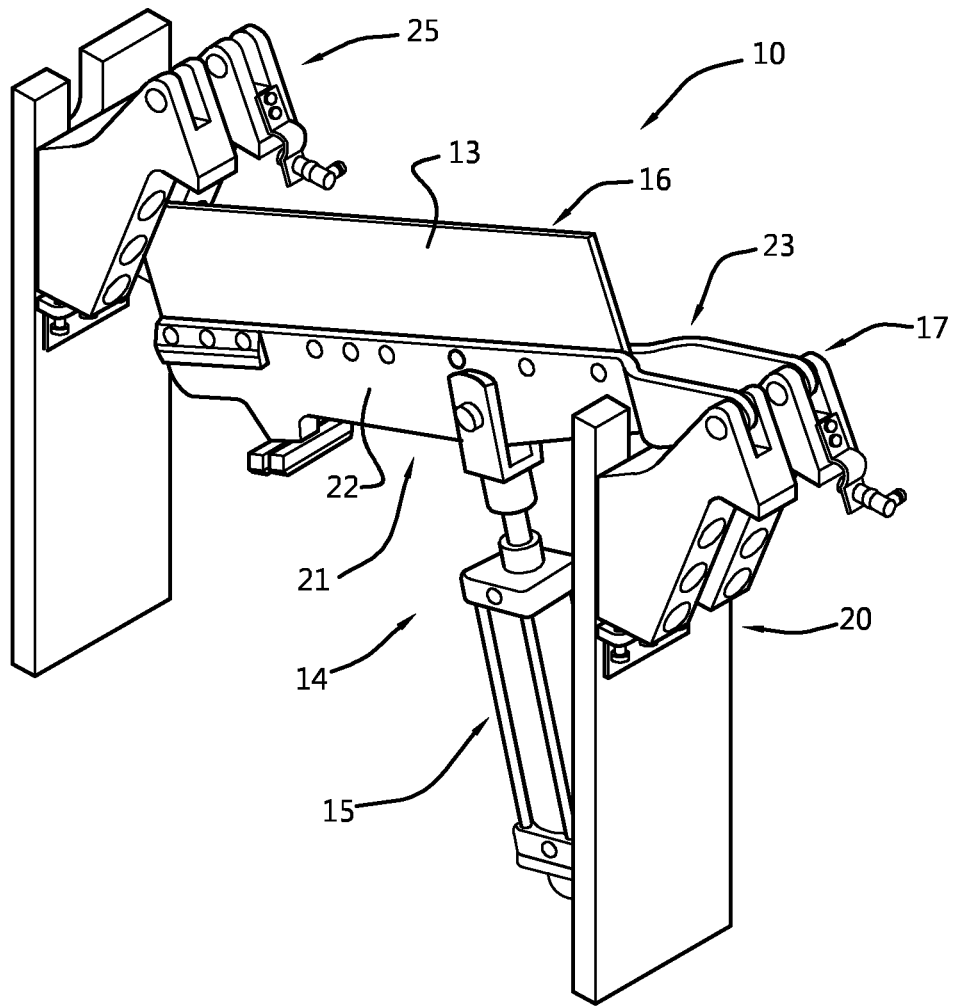
FIG. 3 shows a perspective view of a trim brake of FIG. 2.

FIG. 3 shows a single trim brake 10 in close up. The trim brake comprises an induction blade 13, an induction blade support 14, and an actuator 15. It is noted that in the embodiment shown, the induction blades support 14 is shared with the other trim brake, and is only partially shown.

The induction blade 13 of the trim brake 10 has an elongated braking edge 16 for passing through the gap 9 of the magnet arrangement 7 located on the passenger vehicle 4. Passage of the induction blade 13 through the gap 9 defined by the magnets of the magnet arrangement 7 located on the passenger vehicle 4 causes eddy current to be induced in the induction blade which results in a braking force between the magnets and the induction blade.

Figure 4:
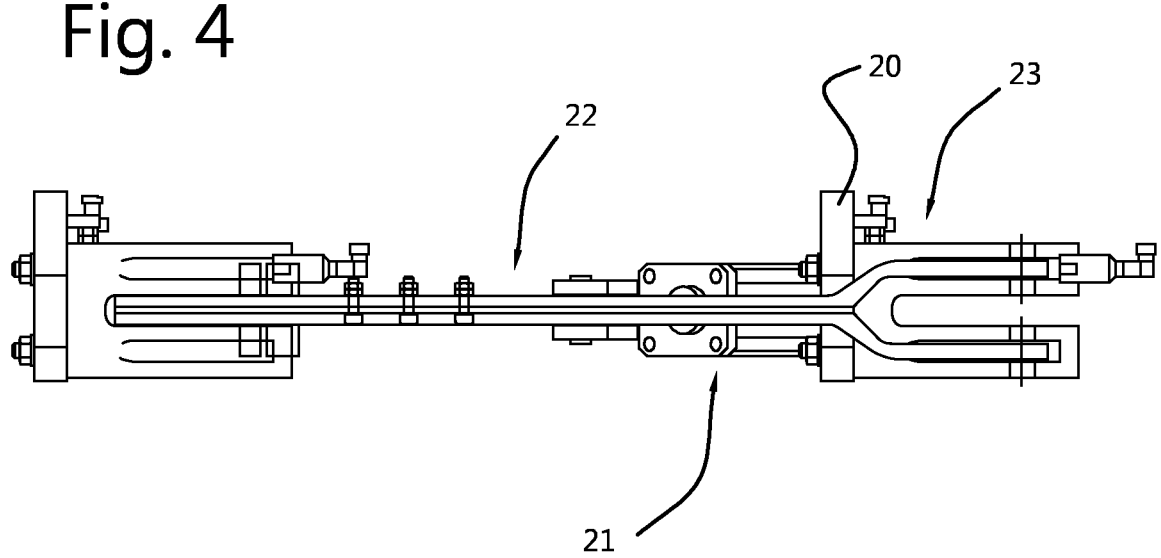
FIG. 4 shows a top view of the trim brake of FIG. 2.
Figure 5:
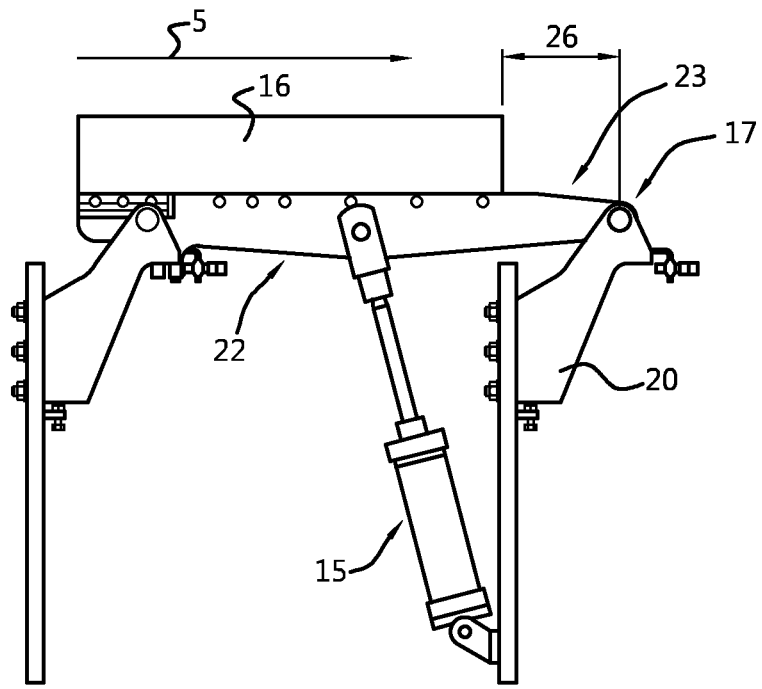
FIG. 5 shows a side view of the trim brake of FIG. 2 with its induction blade in an active position.
Figure 6:
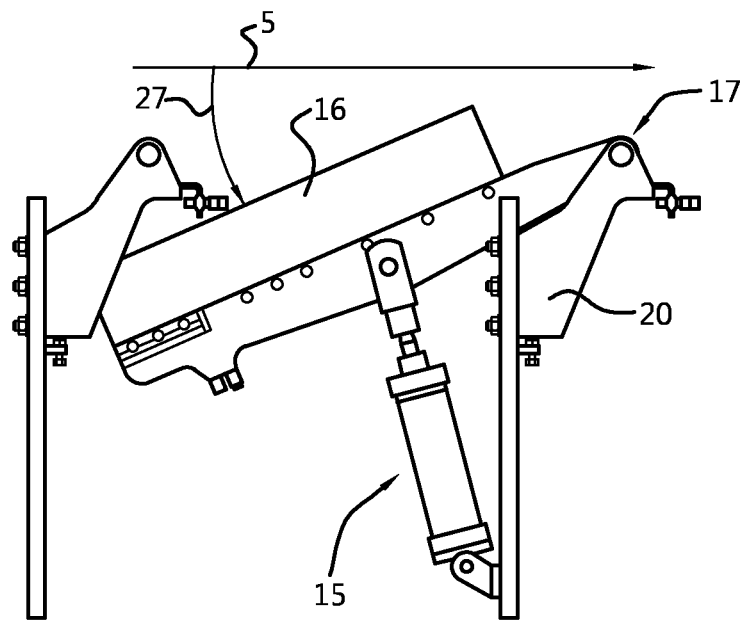
FIG. 6 shows a side view of the trim brake of FIG. 2 with its induction blade in an inactive position.

The induction blade support 14 pivotably supports the induction blade 13, such that the induction blade can be pivoted about an induction blade pivot axis 17 between an active position, shown in FIG. 4, for trimming the speed of the passenger vehicle while it passes the trim brake, and an inactive position, shown in FIG. 5.

The actuator 15, in the particular embodiment shown provided in the form of a pneumatic cylinder, can pivot the induction blade 13 between its active and its inactive position.

When in its active position, the induction blade 13 is supported with its braking edge 16 extending substantially parallel to the direction of travel 5 of the passenger vehicle 4 passing the trim brake 10, and with its braking edge 16 located in the trajectory of the magnet arrangement 7 of the passing passenger vehicle (see also FIG. 7).

When in its inactive position, the induction blade 13 is supported with its braking edge 16 extending at an angle, indicated with arrow 27 in FIG. 5, to the trajectory of travel 5 of the passenger vehicle 4 passing the trim brake 10, and with its braking edge 16 located outside the trajectory of the magnet arrangement 7 of the passing passenger vehicle 4. Thus, the magnets of the passenger vehicle will pass by the induction blade beyond the range of substantial magnetic interaction.

The speed trim system furthermore comprises sensors 18 and a control system 19.

In the particular embodiment shown, each array of trim brakes is provided with sensors 18 for measuring the speed of the passenger vehicle 4 approaching the trim brake, more in particular the array of trim brakes 10. In addition, sensors 18 are also provided along the array of trim brakes 10 to measure the speed of the passenger vehicle 4 while passing a trim brake 10 of said array. It is noted that this measurement can also be used to provide information on the approaching speed of the passenger vehicle with respect to a trim brake located directly down the track. It is observed that many types of sensors, in many configurations or set ups along the track, are known for measuring the speed of a passenger vehicle travelling along the track. These sensors and there set ups are considered to be part of the knowledge of the skilled person and is therefore not elaborated upon herein.

The control system 19 of the speed trim system 6 is configured for receiving speed information from the sensors 18 located along the vehicle track 2 and is configured for comparing the speed measurement with a reference speed. The control system 19 is furthermore configured for controlling the actuator 15 to pivot the induction blade 13 into and out of its active position to trim the speed of the passenger vehicle 4 passing the trim brake 10 to a speed close to, or below the predetermined reference speed.

In the particular embodiment shown, a single control system 19 is connected with all sensors 18 and actuators 15 of the trim brakes 10. Thus, the single control system can control all arrays of trim brake modules and thus trim the speed of a passenger vehicle along different sections of the vehicle track. In an alternative embodiment, single trim brakes may be used instead of, or in addition to arrays of trim brakes. Also, multiple control systems may be provided, for example each array may be provided with its own control system.

The exemplary trim brake 10 shown in FIG. 3 is configured such that the induction blade 13 of the trim brake is supported in its active position when the actuator is actuated. In the embodiment the actuator is provided in the form of a pneumatic cylinder 15 for pivoting the induction blade 13 between its active and its inactive position. When the cylinder is in its actuated state, i.e. when extended, it supports the induction blade in its active position.

Furthermore, the preferred embodiment shown, the control system 19 is configured to support the induction blade 13 in its active position when the passenger vehicle 4 approaches the trim brake 10, and only pivots the induction blade into its inactive position when the speed of the passenger vehicle is at, or below, the predetermined reference speed.

According to the invention, the induction blade 13 has an elongated braking edge 16, which in the embodiment shown is the upper part of the induction blade, i.e. the part of the induction blade that is received in the gap of the magnet arrangement of a passing passenger vehicle when the induction blade is supported in its active position.

According to the invention, the induction blade 10 is pivotable supported at one end thereof such that the braking edge 16 is moved along a curved trajectory 27 when moved between its active braking position and its inactive position, in which it is located outside the track, or at least outside the trajectory of magnets provided on a passenger vehicle travelling along the track. The present invention thus provides an amusement ride 1 in which the braking force acting between the magnet arrangements 7 of the at least one passenger vehicle 4 and the induction blade 13 is adjustable rapidly and accurately and with low effort.

Due to the mobility of the induction blade 13, the magnetic field generated by the interaction between the induction blade 13 and the magnet arrangement 7 of a passing passenger vehicle 4, and thus the extent of eddy-currents induced in the induction body which eddy currents are proportional to the effective braking force, can be adjusted rapidly and accurately. In contrast with the state of the art, the total mass of the magnet arrangement is no longer moved to change the braking force.

Furthermore, by providing an amusement ride with a speed trim system according to the invention differences in speed of the passing passenger vehicles can be regulated, more in particular, of passenger vehicles travelling along the track with a speed above a predetermined reference speed can be trimmed down to that reference speed.

In the particular embodiment shown, the speed trim system 6 comprises arrays of multiple trim brakes 10, more in particular of trim brake modules 12 each comprising two parallel mounted induction blades 13. The trim brakes 10 are located adjacent each other and along the track 2, such that the induction blades 13 of these trim brakes 10, when in their active position, are located in line with each other, when seen in the direction of travel of a passenger vehicle passing the array of trim brakes, and thus define a speed trim zone 11 extending along a trajectory of the passenger vehicle track 2.

By providing these arrays of trim brakes the braking capacity can not only be adjusted by pivoting the induction blades from their active into their inactive position, but also by adjusting the number of induction blades that are supported in their active position, i.e. the number of trim brakes to be used for trimming the speed of the passenger vehicle. Such an array of trim brakes thus allows for a more precise speed trimming and is in particular beneficial when used in combination with short, for example single, passenger vehicles travelling along the track, i.e. passenger vehicles with a comparatively short array of magnets, In the embodiment shown, the trim brakes 10 are provided in the form of a trim brake module 12 of which the induction blade support 14 comprises an induction blade support base 20 which is configured to mount the trim brake 10 to the vehicle track structure 3 of the amusement ride 1. In the particular embodiment, the base 20 of the induction blade support 14 is a mounting structure in the form of a plate, for mounting the trim brake 10 on a backbone of a vehicle track structure 3, and is configured to saddle the backbone of the track and to engage the rails of the track.

Furthermore, in the preferred embodiment shown the induction blade support 14 further comprises an induction blade spacer arm 21, which induction blade spacer arm has a support section 22 at one end, via which support section the induction blade 13 is mounted to the spacer arm, and a spacer section 23, via which spacer section the spacer arm is pivotable mounted to the induction blade support base 20. Part of the spacer section extends between the induction blade pivot axis 17 and the elongated braking edge 16 of the induction blade 13, such that the braking edge is in its longitudinal direction located at a spacer distance 26 from the induction blade pivot axis 17. Thus, the induction blade 13 is pivotable supported not only at an end thereof, such that the braking edge 16 is moved along a curved trajectory when moved between its active braking position and its inactive position, but at a distance of that one end of the braking edge, to more rapidly and accurately and with low effort adjust the induction blade between its active and its inactive position.

Also, in the particular embodiment shown, the spacer section 23 of the spacer arm 21 is offset relative to the support section 22, such that the spacer section is located outside a plane defined by the induction blade, which is shown in the top view depicted in FIG. 4. This configuration of the spacer arm allows for mounting two trim brakes adjacent each other to a track structure such that the induction blades of the two trim brakes, when in their active position, are located in line with each other and the braking edges are located at a mutual distance smaller than the spacer distance. Thus, the effect of the spacer arm can be combined with a compact configuration of arrays of induction blades.

In the preferred embodiment shown, the spacer arm 21 is essentially Y-shaped, with the two arms of the Y-shape forming the spacer section 23 of the spacer arm and the single leg of the Y-shape forming the support section 22 of the spacer arm. The spacer section 23 is thus configured for receiving and end section the induction blade of an adjacent trim brake between its two arms.

It is noted that in the embodiment shown, the induction blade support base is configured for pivotable mounting the two legs of the spacer arm. Therefore, the base is provided with two dedicated mounts. In FIGS. 3-6, in addition to the base 20 of the trim brake 10, also the mount 25 of an adjacent trim brake is depicted. This to clarify how the free end of the induction blade 13 can be positioned closely to, and in line with, the induction blade of an adjacent trim brake 10. In the configuration shown, the induction blade pivot axis 17 intersects the induction blade of the adjacent trim brake, when the latter is positioned in its active position.

Furthermore, in the exemplary embodiment shown, the cylinder 15 is a direct acting cylinder, i.e. is coupled with one end to the induction blade 13, in the particular embodiment shown to the support section 22 of the spacer arm 21, and with the other end to the support base 20 of the blade support 14. Also, in the embodiment shown, the central axis of the cylinder 15 is located in line with the induction blade 13 to provide a compact trim brake 10.

In the embodiment shown, the trim brake 10 is of a modular design, such that it can be mounted to and dismounted from the vehicle track 2, more in particular to the vehicle track structure 3 and from the vehicle track structure, as a whole. The trim brake 10 comprises two parallel induction blades 13, each pivotable supported and each provided with their own actuator 15, which induction blades and actuators are each mounted on the shared base 20 of the induction blade support 14, such that by demounting the shared base from the vehicle track structure the whole trim brake is demounted from the vehicle track structure.

In the preferred embodiment shown, the at least one trim brake 10 is mounted to the passenger vehicle track 2 such that the free end of the braking edge, i.e. the end of the braking edge that is located furthest away from the induction blade pivot axis 17 is directed opposite the direction of travel 5 of a passing passenger vehicle, when the induction blade is supported in its active position. By thus positioning the trim brake, the induction blade, when pivoted from its inactive towards its active position, is moved in the direction of travel of the passenger vehicle. Thus, the electromagnetic forces generated by a passenger vehicle passing the trim brake pull the induction blade into its active position, which is beneficial because the support function of the actuator is thus less critical, i.e. when the induction blade is not fully supported in its active position due to for example wear of the actuator or trim, a passing passenger vehicle can pull the induction blade into that position.

Regarding the one or more magnet arrangements provided on a passenger vehicle for cooperating with corresponding induction blades of the trim brakes located along the track, it is noted that the use of permanent magnets in the magnet arrangement is desirable because in contrast with electromagnets, the magnetic field emanating from permanent magnets does not rely on a power supply.

According to the invention, the speed of the passenger vehicle 4 travelling along the track 2 of the amusement ride 1 towards a trim brake 10, can be trimmed by the control system 19. The sensors 18 of the speed trim system 6 measure the speed of the passenger vehicle approaching the trim brake. If the speed of the passenger vehicle is above a predetermined reference speed; the passenger vehicle is slowed down while it passes the trim brake. The induction blade of the trim brake is supported in its active position such that it interacts with the corresponding magnet arrangement on the passenger vehicle, thus braking the passenger vehicle while it passes the trim brakes. The trim brake is pivoted into its inactive position when the passenger vehicle has been slowed down to the predetermined reference speed.

In the particular embodiment shown, the trim brakes are provided in arrays, the arrays of trim brakes defining a speed trim zone along the track. Thus, according to the invention, the speed of the passenger vehicle 4 travelling along the track 2 of the amusement ride 1 towards an array of trim brakes 10 can be trimmed by the control system 19 in the speed trim zone.

The control system supports the induction blades of the trim brakes in their active position, while measuring the speed of a passenger vehicle approaching the array of trim brakes. Since the array comprises multiple trim brakes, in dependence of the speed measured, the control system can pivot one or more induction blades, preferably of the trim brakes located at the downstream end of the array, into their inactive position to thus provide the array of trim brakes with a dedicated braking capacity, i.e. a braking capacity that matches the amount of braking required to slow down the approaching passenger vehicle unit it travels at the predetermined reference speed.

When the passenger vehicle passes the first of the array of trim brakes, and continue braking the passenger vehicle while it passes the array of trim brakes; and pivoting one or more induction blades into their inactive position, to stop braking the passenger vehicle, when the passenger vehicle has reached a predetermined reference speed.

In a further method according to the invention, the trim brakes are pivoted into their inactive position one after the other to gradually reduce the braking force when the passenger vehicle has reached the predetermined reference speed.

The invention has been illustrated in combination with passenger vehicles or coaches. It is however noted that other types of vehicles can also be used in combination with the ride according to the invention, and can be slowed down using the trim brake module according to the invention. For example unmanned maintenance cars or catcher cars (for pulling or pushing a train of coaches along a trajectory of the track) can also be provided with magnets that cooperate with the brake module according to the invention.

Figure 8:
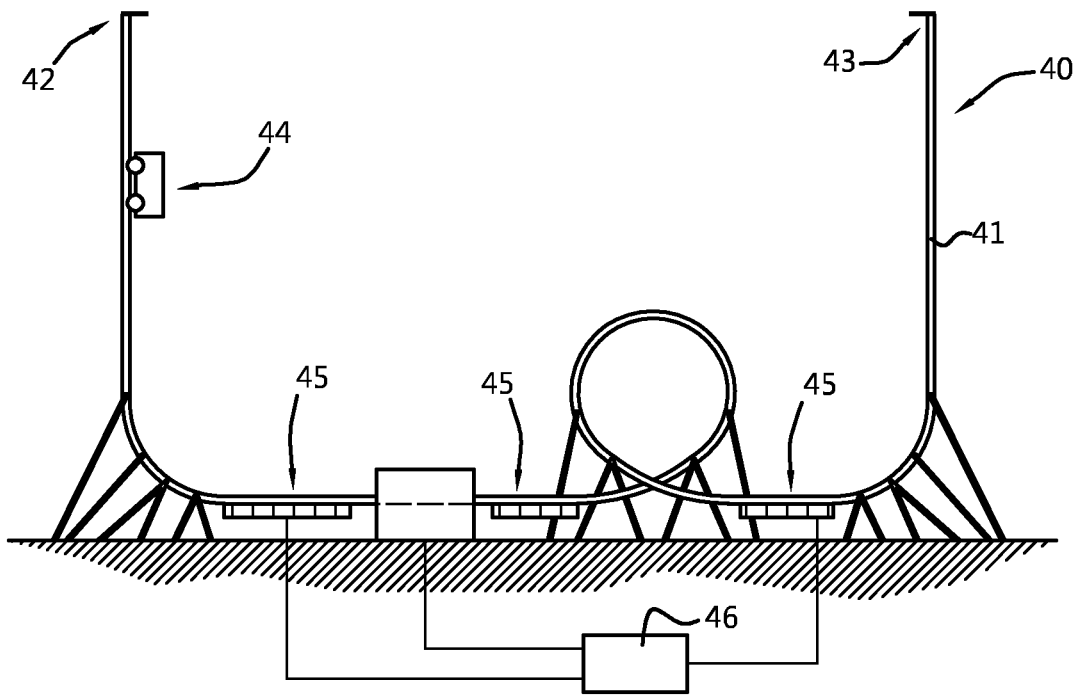
FIG. 8 shows an alternative ride.

FIG. 8 shows an alternative amusement ride 40 according to them invention, in which the vehicle track 41 extends between a first end 42 and a second end 43, and the passenger vehicle 44 travels between those ends. In this particular embodiment speed trim zones 45 are provided at opposite sides of the station. During the ride, or at least during the phase of the ride in which the passenger vehicle is sped up to the speed needed to reach the upper ends of the track, the induction blades of the trim brakes are held in their inactive positions. When the ride ends, the trim brakes in the speed trim zone are used to slow down the passenger vehicle to a speed suitable for stopping the passenger vehicle in the station. In such a ride the speed of the passenger vehicle may be too high to allow it to be slowed down in a single pass through the speed trim zone located at the entry of the station. Thus, the passenger vehicle may pass the speed trim zones multiple times before it has been slowed down far enough to let the passenger vehicle be stopped inside the station. Furthermore, the control system 46 may be configured to gradually decrease the predetermined, for example with a certain percentage each time the passenger vehicle passes the speed trim zone, to enable a gradual slowdown of the passenger vehicle. It is thus noted that in embodiments according to the invention, for example the one shown in FIG. 8, the passenger vehicle may pass a speed trim zone multiple times before it reaches its final predetermined reference speed, and the predetermined reference speed may be adjusted during the rides, i.e. while the passenger vehicle travels along the vehicle track.

Figure 9:
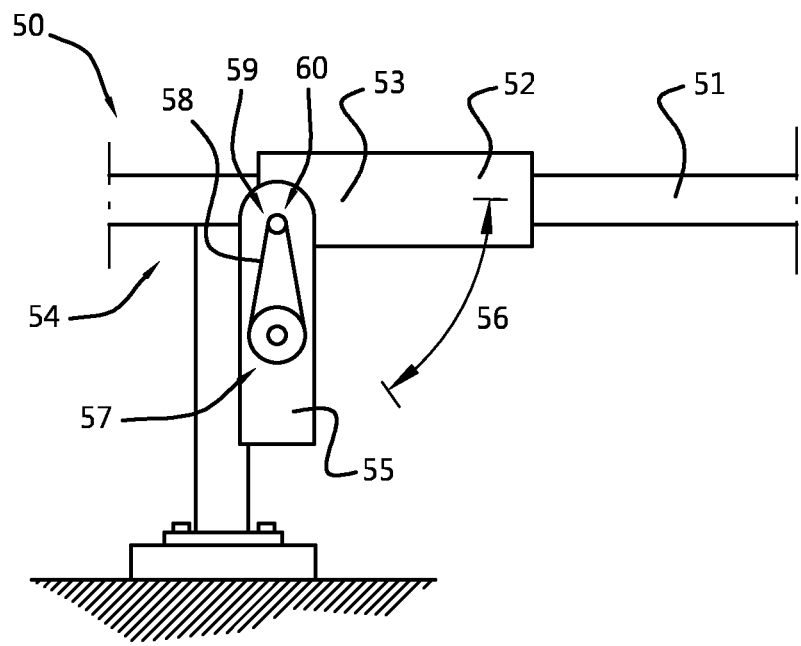
FIG. 9 shows an alternative trim brake according to the invention.

FIG. 9 chemically depicts a trim brake 50 located along the vehicle track 51 of an amusement ride according to the invention. The trim brake 50 has an induction blade 52 pivotable supported by an induction blade spacer arm 53 of an induction blade support 54, such that the induction blade 52 can be pivoted over an angle 56 about the pivot axis 60. In the embodiment shown, the induction blade spacer arm 53 is an integral part of the induction blade 52.The induction blade support 54 further comprises an induction blade support base 55 and an induction blade spacer arm 53. An actuator 57 is provided in the form of an electric drive, which electric drive is connected via a chain 58 to a sprocket wheel 59 provided on the pivot axis 60 of the trim brake 50.

Figure 10:
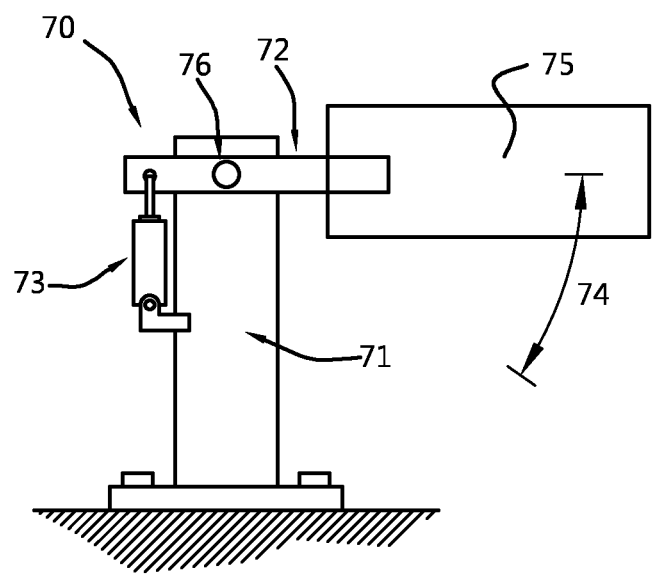
FIG. 10 shows another alternative trim brake according to the invention.

In FIG. 10 yet another alternative trim brake 70 according to the invention is schematically depicted, the trim brake 70 comprising an induction blade support base 71, an induction blade spacer arm 72 and an actuator 73 for pivoting the induction blade 75 between its active and inactive position over an angle 74. The actuator 73 is provided in the form of an electro magnet that pivots the induction blade 75 into its active position when actuated. Furthermore, in the embodiment shown, the pivot axis 76 of the induction blade 75 is provided between the induction blade 75 and the part of the induction blade spacer arm 72 which is coupled with the actuator.

From the foregoing, it will be clear to the skilled person, that within the framework of the invention as set forth in the claims also many variations other than the examples described above are conceivable.

REFERENCE SIGNS 01 amusement ride
02 vehicle track
03 vehicle track structure
04 passenger vehicle
05 direction of travel
06 speed trim system
07 magnet arrangement
08 rows of magnets
09 gap between rows of magnets
10 trim brake
11 speed trim zone
12 trim brake module comprising two trim brakes
13 induction blade
14 induction blade support
15 actuator
16 braking edge
17 pivot axis
18 sensors of the speed trim system
19 control system of the speed trim system
20 induction blade support base
21 induction blade spacer arm
22 support section spacer arm
23 spacer section spacer arm
26 spacer distance
27 angle of displacement induction blade
28 back bone 29 rail tubes
30 wheels
31 side roller
32 lift-off rollers
40 amusement ride
41 vehicle track
42 first end track
43 second end track
44 passenger vehicle
45 speed trim zones
46 control system
50 trim brake
51 vehicle track
52 induction blade
53 induction blade spacer arm
54 induction blade support
55 induction blade support base
56 pivot angle
57 actuator
58 chain
59 sprocket wheel
60 pivot axis
70 trim brake
71 induction blade support base
72 induction blade spacer arm
73 actuator
74 pivot angle
75 induction blade
76 pivot axis

The invention claimed is:

1. An amusement ride, comprising:
   at least one passenger vehicle;
   a vehicle track, which vehicle track comprises a vehicle track structure for supporting the passenger vehicle and which vehicle track structure is configured for guiding the passenger vehicle along the vehicle track in a direction of travel;
   a speed trim system for reducing the speed of the at least one passenger vehicle traveling along the vehicle track, the speed trim system comprising:
      a magnet arrangement located on the at least one passenger vehicle, which magnet arrangement comprises at least one row of magnets;
   at least one trim brake located along the track, which trim brake comprises:
      an induction blade, the induction blade having an elongated braking edge for passing closely along the at least one row of magnets of the magnet arrangement of the passenger vehicle;
      an induction blade support, which induction blade support pivotably supports the induction blade, such that the induction blade can be pivoted about an induction blade pivot axis between an active position, for trimming the speed of the passenger vehicle while it passes the trim brake, and an inactive position:
         in which active position the induction blade is supported with its braking edge extending substantially parallel to the direction of travel of the passenger vehicle passing the trim brake, and with its braking edge located in the trajectory of the magnet arrangement of the passing passenger vehicle; and
         in which inactive position the induction blade is supported with its braking edge extending at an angle to the trajectory of travel of the passenger vehicle passing the trim brake, and with its braking edge located outside the trajectory of the magnet arrangement of the passing passenger vehicle; and
      an actuator, which can pivot the induction blade between its active and its inactive position; and
      one or more sensors for measuring the speed of the passenger vehicle approaching and/or passing the trim brake; and
   a control system, which control system is configured for receiving speed information from the one or more sensors and for comparing the speed measurement with a reference speed, and for controlling the actuator to pivot the induction blade into and/or out of its active position to trim the speed of the passenger vehicle passing the trim brake, to trim the speed of the passing passenger vehicle.

2. The amusement ride according to claim 1, wherein the speed trim system comprises an array of multiple trim brakes located adjacent each other and along the track, such that the induction blades of the trim brakes, when in their active position, are in line with each other when seen in the direction of travel of a passenger vehicle passing the array of trim brakes, and thus define a speed trim zone extending along a trajectory of the passenger vehicle track.

3. The amusement ride according to claim 1, wherein the at least one trim brake is mounted to the track such that the end of the braking edge of the trim brake located furthest away from the pivot axis points opposite the direction of travel when the induction blade is supported in its active position.

4. The amusement ride according to claim 1, wherein the actuator is controlled to support the induction blade of the trim brake in its active position when a passenger vehicle approaches the trim brake, and to pivot the induction blade into its inactive position while the passenger vehicle passes and the speed of the passenger vehicle is at, or below, the predetermined reference speed.

5. The amusement ride according to claim 1, wherein the blade support of the at least one trim brake comprises an induction blade spacer arm, which induction blade spacer arm has a support section at one end, which support section is mounted to the induction blade, and a spacer section at an opposite end, via which spacer section the spacer arm is pivotably supported such that part of the spacer section extends between the induction blade pivot axis and the elongated braking edge of the induction blade and the elongated braking edge is thus in its longitudinal direction located at a spacer distance from the induction blade pivot axis.

6. The amusement ride according to claim 5, wherein the spacer distance is at least 15 cm and/or is at least 15% of the length of the braking edge.

7. The amusement ride according to claim 5, wherein the spacer section of the spacer arm is offset relative to the support section, such that the spacer section is located outside a plane defined by the induction blade, to allow for two or more trim brakes to be located closely adjacent to each other, such that the induction blades of the trim brakes are, when in their active positon, in line with each other and an air gab between the braking edges of those induction blades is smaller than the length of the spacer section of the spacer arm.

8. The amusement ride according to claim 5, wherein the spacer arm is essentially Y-shaped, with the two arms of the Y-shape forming the spacer section of the spacer arm and the single leg of the Y shape forming the support section of the spacer arm, and wherein the spacer section is configured for receiving and end section the induction blade of an adjacent trim brake between its two arms.

9. The amusement ride according to claim 1, wherein the trim brake is a trim brake module that can be mounted to the track and demounted from the track as a whole, in which trim brake module the induction blade support comprises a support base, via which support base the trim brake is mounted to the track.

10. The amusement ride according to claim 1, wherein the actuator is a cylinder, and wherein the central axis of the cylinder is located in line with the blade.

11. The amusement ride according to claim 1 further comprising a launch system for propelling the at least one passenger vehicle along the vehicle track, which launch system comprises an electro magnet arrangement configured to cooperate with the magnet arrangements located on the at least one passenger vehicle to generate a drive force for propelling the vehicle along the track.

12. A trim brake module for mounting along a vehicle track of an amusement ride to trim the speed of a passenger vehicle traveling along the track, to provide an amusement ride according to claim 1, wherein the trim brake module comprises a trim brake having:
 an induction blade, the induction blade having an elongated braking edge for passing along at least one row of magnets of a magnet arrangement of the passenger vehicle;
 an induction blade support, which induction blade support pivotable supports the induction blade, such that the induction blade can be pivoted about an induction blade pivot axis between an active position, for trimming the speed of the passenger vehicle while it passes the trim brake, and an inactive position; and
 an actuator, which can pivot the induction blade between its active and its inactive position;
 wherein the induction blade support comprises a support base which is configured to mount the trim brake to a track structure of the vehicle track of the amusement ride:
  such that the induction blade, when in its active position, is supported with its braking edge extending substantially parallel to a direction of travel of the passenger vehicle guided by the track structure along a vehicle track, and thus along the trim brake mounted to the track structure of that vehicle track, such that the braking edge of the induction blade, when in its active position, is located in the trajectory of a magnet arrangement of the passenger vehicle passing the trim brake to interact with those magnets and generate a braking force; and
  such that the induction blade, when in its inactive position, is supported with its braking edge extending at an angle to the trajectory of travel of the passenger vehicle passing the trim brake, and with its braking edge located outside the trajectory of the magnet arrangement of the passing passenger vehicle.

13. The trim brake module according to claim 12, wherein the blade support further comprises an induction blade spacer arm, which induction blade spacer arm has a support section at one end, which support section is mounted to the induction blade, and a spacer section at an opposite end, via which spacer section the spacer arm is pivotable mounted to the support base, and wherein part of the spacer section extends between the induction blade pivot axis and the elongated braking edge of the induction blade and the braking edge is thus in its longitudinal direction located at a spacer distance from the induction blade pivot axis.

14. The trim brake module according to claim 13, wherein the spacer distance is at least 15 cm and/or is at least 15% of the length of the braking edge.

15. The trim brake module according to claim 13, wherein the spacer section of the spacer arm is offset relative to the support section, such that the spacer section is located outside a plane defined by the induction blade, to allow for mounting two trim brake modules adjacent each other along a vehicle track such that the induction blades of the trim brakes of the two trim brake modules, when in their active positon, are in line with each other and an air gab between the braking edges of those induction blades is smaller than the length of the spacer section of the spacer arm.

16. The trim brake module according to claim 12, wherein the support base of the induction blade support is a mounting structure for mounting the trim brake on a backbone of a track structure, and which mounting structure is configured to saddle the backbone of a track or is configured to engage the rails of the track.

17. The trim brake module according to claim 12, wherein the actuator comprises a single pneumatic cylinder for pivoting the induction blade between its active and its inactive position, which cylinder is coupled with one end to the induction blade or the support section of the spacer arm of the blade support and with the other end to the support base of the induction blade support.

18. The trim brake module according to claim 12, wherein the trim brake module comprises multiple pivotable supported induction blades, to interact with corresponding magnet arrangements provided on the passenger vehicle travelling along the track.

19. A method for trimming the speed of a passenger vehicle travelling along the track of the amusement ride according to claim 1, comprising the steps of:
 providing at least one trim brake;
 supporting the induction blade of the at least one trim brake in its active position;
 measuring the speed of a passenger vehicle approaching the trim brake;
 if the speed of the passenger vehicle is above a predetermined reference speed: braking the passenger vehicle while it passes the trim brake; and
 pivoting the trim brake into its inactive position when the passenger vehicle has been slowed down to the predetermined reference speed.

20. The method according to claim 19, further comprising the steps of:
 providing an array of trim brakes, the array of trim brakes defining a speed trim zone along the track of the amusement ride;
 supporting the induction blades of the trim brakes in their active position;
 measuring the speed of a passenger vehicle approaching the trim brake;
 if the speed of the passenger vehicle is above a predetermined reference speed: braking the passenger vehicle while it passes the array of trim brakes; and
 pivoting one or more induction blades into their inactive position when the passenger vehicle has been slowed down to the predetermined reference speed.

* * * * *